(12) United States Patent
Dunietz et al.

(10) Patent No.: US 6,789,229 B1
(45) Date of Patent: Sep. 7, 2004

(54) DOCUMENT PAGINATION BASED ON HARD BREAKS AND ACTIVE FORMATTING TAGS

(75) Inventors: Jerry J. Dunietz, Seattle, WA (US); Jason Hills, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/552,230

(22) Filed: Apr. 19, 2000

(51) Int. Cl.[7] .................................................. G06F 15/00

(52) U.S. Cl. ..................... 715/525; 715/513; 715/500.1

(58) Field of Search ............................... 715/525, 523, 715/909, 513, 500.1

(56) References Cited

U.S. PATENT DOCUMENTS

| | | | |
|---|---|---|---|
| 4,864,502 A | 9/1989 | Kucera et al. ................. | 704/8 |
| 5,524,201 A | 6/1996 | Shwarts et al. | |
| 5,956,034 A | 9/1999 | Sachs et al. | |
| 5,987,482 A | 11/1999 | Bates et al. | |
| 6,055,544 A | 4/2000 | DeRose et al. ........... | 707/104.1 |
| 6,128,633 A | 10/2000 | Michelman et al. | |
| 6,175,845 B1 * | 1/2001 | Smith et al. ................ | 715/525 |
| 6,177,936 B1 | 1/2001 | Cragun ....................... | 345/760 |
| 6,278,992 B1 | 8/2001 | Curtis et al. ................... | 707/3 |
| 6,330,574 B1 | 12/2001 | Murashita ................... | 715/513 |
| 6,331,867 B1 * | 12/2001 | Eberhard et al. .......... | 345/864 |
| 6,370,553 B1 | 4/2002 | Edwards et al. ............ | 715/514 |
| 6,424,982 B1 * | 7/2002 | Vogel .......................... | 715/531 |
| 6,442,576 B1 | 8/2002 | Edelman et al. ............ | 715/513 |
| 6,493,734 B1 * | 12/2002 | Sachs et al. ................ | 715/526 |
| 6,546,406 B1 | 4/2003 | DeRose et al. ............. | 715/513 |
| 6,581,062 B1 | 6/2003 | Draper et al. ............... | 707/100 |
| 6,604,106 B1 | 8/2003 | Bodin et al. ................ | 707/101 |

FOREIGN PATENT DOCUMENTS

| | | |
|---|---|---|
| EP | 0924629 A2 | 6/1999 |
| WO | WO 97/10541 | 3/1997 |
| WO | WO 00/23911 | 4/2000 |
| WO | WO 00/63784 | 10/2000 |
| WO | WO 01/29635 | 4/2001 |

OTHER PUBLICATIONS

Open eBook™ Publication Structure 1.0, pp. 1–47, Sep. 16, 1999.

HTML 4.01 Specification, W3C Recommendation Dec. 24, 1999.

Miyzawa, M., et al., Institution of Eletrical Engineers, INSPEC/IEE, Stevenage, Great Britain (1990) Database Accession No. AN 3986160, XP002180891 1990.

"Automatic Reformat Propagation", IBM Technical Disclosure Bulletin, vol. 29, No. 10, Mar. 1987, p. 4682.

(List continued on next page.)

*Primary Examiner*—Stephen S. Hong
*Assistant Examiner*—Matthew Ludwig
(74) *Attorney, Agent, or Firm*—Banner & Witcoff, Ltd.

(57) ABSTRACT

Pagination of a document is achieved through the use of an index of predetermined hard breaks within the document. When a selected portion of the document is identified, an immediately prior hard break relative to the selected portion is identified. Active formatting tags applicable to content following the identified hard break are identified to determine proper layout for any intervening pages between the identified hard break and the selected portion. In this manner, a complete and reproducible page can be associated with the selected portion, independent of page number determination. To determine a page number, page counts between hard breaks are stored. A sum of page counts between hard breaks is calculated up to the identified hard break. The final page number is this sum plus the number of pages determined between the identified hard break and the reproducible page.

6 Claims, 4 Drawing Sheets

OTHER PUBLICATIONS

T. Adam, et al., "Document Pagination", IBM Technical Disclosure Bulletin, vol. 24, No. 9, Feb. 1982 p. 4579.

NuvoMedia, Inc., Rocket eBook information retrieved from the website, www.rocketbook.com/Products/index.html on Oct. 14, 1999.

NuvoMedia, Inc., Rocket eBook information retrieved from the website, www.rocketbook.com/Products/Tour/index.html on Oct. 14, 1999.

NuvoMedia, Inc., Rocket eBook information retrieved from the website, www.rocketbook.com/Product/Fazq/technical.html on Oct. 14, 1999.

NuvoMedia, Inc., Rocket eBook information retrieved from the website, www.rocketbook.com/Products/Faq/standards.html on Oct. 14, 1999.

NuvoMedia, Inc., Rocket eBook information retrieved from the website, www.rocketbook.com/Products/Faq/using.html on Oct. 14, 1999.

Softbook Press, Inc., SoftBook Reader information retrieved from the website, www.softbook.com/consumer/reader.asp on Oct. 14, 1999.

* cited by examiner

DOCUMENT PAGINATION BASED ON HARD BREAKS AND ACTIVE FORMATTING TAGS

CROSS-REFERENCE TO RELATED APPLICATIONS

This patent application is related to the following patent applications filed herewith:
(1) U.S. patent application Ser. No. 09/552,262, entitled "Pre-Computing and Encoding Techniques for an Electronic Document to Improve Run-Time Processing," filed on Apr. 19, 2000, and having named inventors Jerry Dunietz, Nathan Lewis, and Jason Hills.
(2) U.S. patent application Ser. No. 09/552,001, entitled "Hypertext Link Destination Index For An Electronic Document," filed on Apr. 19, 2000, and having named inventors Jerry Dunietz and Jason Hills.

TECHNICAL FIELD

The present invention relates generally to display of electronic documents and, in particular, to a technique for efficiently performing pagination of such a document.

BACKGROUND OF THE INVENTION

So-called electronic books are known in the art and are increasingly becoming a part of ordinary life. In an electronic book, documents are presented to a reader using a computer-based display device. Examples of such devices are the "ROCKET EBOOK" device by NuvoMedia, Inc. and the "SOFTBOOK READER" device by Softbook Press, Inc. One aspect of printed books that may be desirable to replicate in electronic books is the use of consistently reproducible pages and page numbers. However, in the context of electronic documents, certain challenges exist in providing reproducible pages and page numbers to users of an electronic book. A particular problem is how to quickly provide accurate, reproducible pages and page numbers after a user has opened an electronic book to an essentially unknown location in the book. This problem is reflected in the fact that the "ROCKET EBOOK" device currently does not support the use of page numbers.

The technique of background pagination is generally known in the art of electronic documents. Using this technique, a user may choose to view a selected portion of a document in paginated or print-preview form. While the user is viewing a selected portion of the document, the computer accesses the file storing the document, locates the beginning of the document and recalculates page boundaries going forward until it reaches the selected portion thereby determining a stable page. By keeping a running page count as new page boundaries are recalculated, a page number for the selected portion may also be determined. While this method works, it is processor-intensive and, for any document of significant length (such as a novel) is often likely to take a significant amount of time to complete.

Another solution is to include page information in the computer-readable file storing the document. Thus, along with the text and image data forming the content of the document, one would embed information indicative of page numbers at appropriate locations. However, the page number data embedded in this manner would no longer be accurate in the event that the document is re-formatted, for example, in response to a change in font size of the text. Further still, this implementation would make the format inflexible with respect to display of the document on different sized devices.

Thus, it would be advantageous to provide a technique for efficient determination of reproducible pages of electronic documents, particularly in response to a user opening a document to an otherwise unknown point in the document.

SUMMARY OF THE INVENTION

The present invention provides a technique for efficient pagination. As used herein, the term pagination refers to a process whereby reproducible pages are first determined, followed by the independent determination of page numbers in electronic documents ("documents"). In the context of the present invention, a document encompasses all forms of electronically displayable information that require more than a single screen to be fully displayed. Pagination in accordance with the present invention is achieved through the use of a list or index of predetermined hard breaks within the document. When a user opens a document to a selected portion, the closest such hard break occurring before the selected portion is rapidly identified. A corresponding list or index of active formatting tags (such as HTML tags) applicable to content following the identified hard break is referenced to determine the proper layout for any intervening pages between the identified hard break and the selected portion, and possibly beyond the selected portion. In a preferred embodiment, at least a portion of the document subsequent to the selected portion is also formatted to ensure that the reproducible page has been acceptably and fully formatted. In this manner, a complete and reproducible page can be associated with the selected portion.

To determine the actual page number, the number of pages between hard breaks is also calculated and stored, possibly independently of the document's file structure. Thus, a rolling sum of the number of pages between hard breaks is quickly calculated up to the hard break immediately prior to the selected portion. The final page number is thus the rolling sum plus the number of pages determined between the hard break and the reproducible page. In a preferred embodiment, the processing required to display the reproducible page is performed no later than the processing required to determine the page number. Using these techniques, the present invention allows pagination to be performed in an efficient and timely manner.

DETAILED DESCRIPTION OF THE INVENTION

Figure 1:
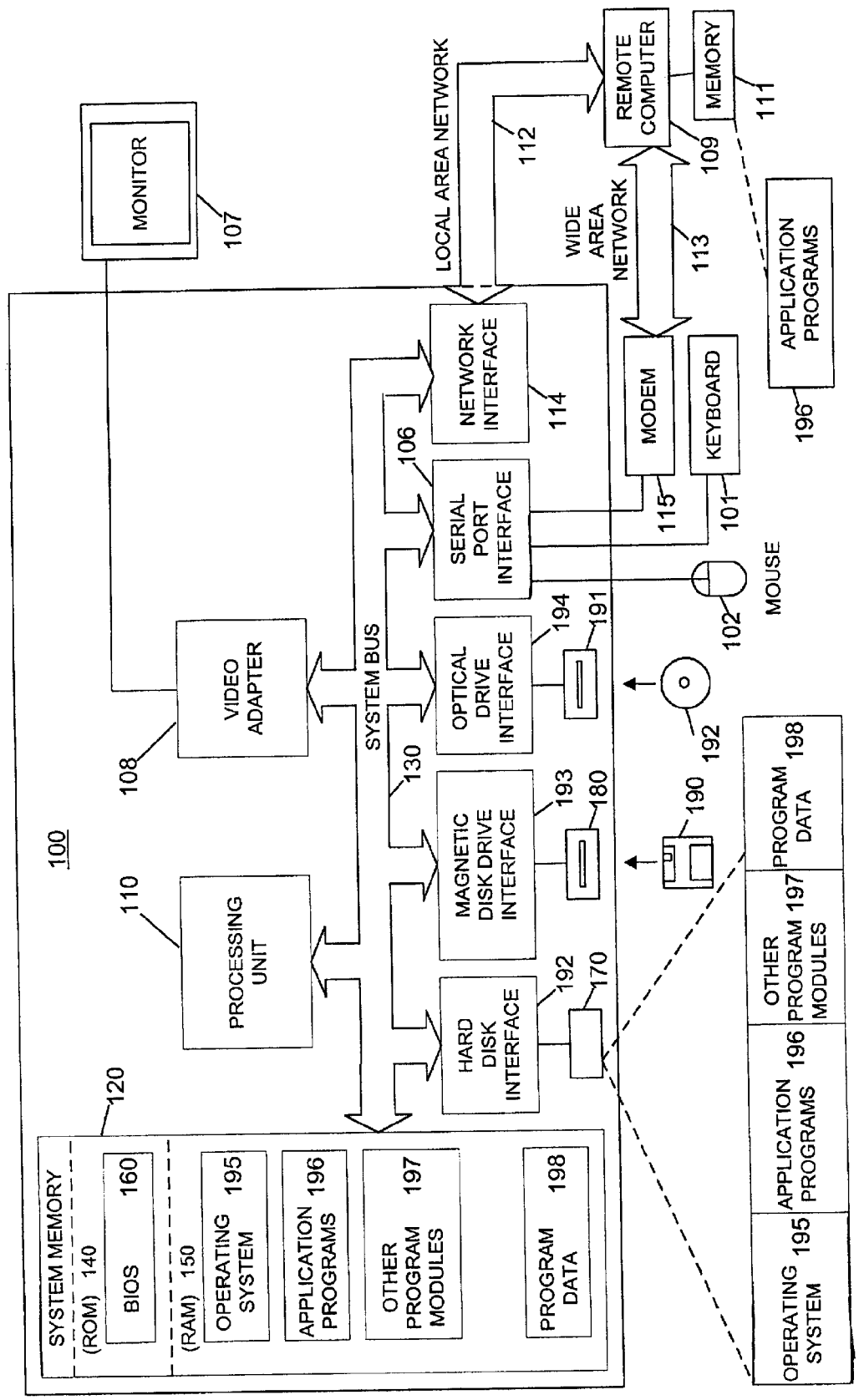
FIG. 1 is a schematic block diagram of a conventional general-purpose digital computing environment that may be used to implement various aspects of the present invention.

The present invention may be more fully described with reference to FIGS. 1–5. FIG. 1 is a schematic diagram of a conventional general-purpose digital computing environment (including handheld computing devices) that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment. It is anticipated that a handheld device implementing this invention would typically have only one mass storage peripheral, either a micro hard disk or else flash memory or equivalent.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input or selection devices, such as a keyboard 101 and a pointing device 102. The pointing device 102 may comprise a mouse, touch pad, touch screen, voice control and activation or other similar devices. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers. Preferably, any implementation of the present invention is designed to be operable in a least case scenario only by touch, and does not always require the use of a keyboard or mouse.

Computer 100 can operate in a networked environment using logical connections to one or more remote computers, such as a remote computer 109. Remote computer 109 typically includes at least some of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet. It is anticipated that a handheld device used to implement the present invention would typically use a wireless LAN interface based on an infra-red or radio frequency communication link.

When used in a LAN networking environment, computer 100 is connected to local network 112 through a network interface or adapter 114. When used in a WAN networking environment, personal computer 100 and remote computer 109 may both include a modem 115 or other means for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

It will be appreciated that the network connections shown are exemplary and other means of establishing a communications link between the computers can be used. The existence of any of various well-known protocols, such as TCP/IP, "ETHERNET", FTP, HTTP and the like, is presumed, and the system can be operated in a client-server configuration to permit a user to retrieve web pages from a web-based server. For example, in an embodiment of the present invention, the remote computer 109 is a server having stored thereon one or more documents that may be accessed by the computer 100.

Figure 2:
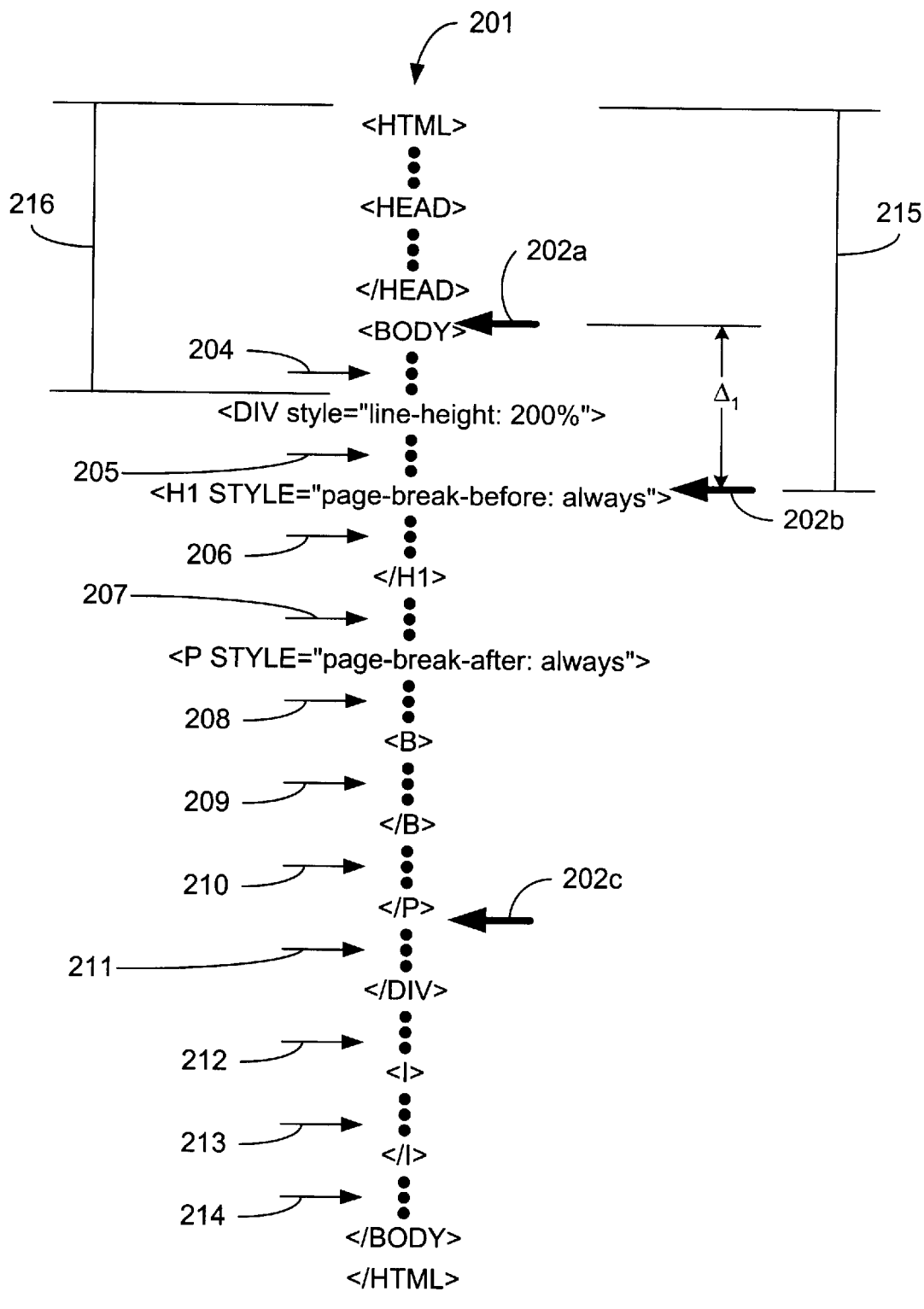
FIG. 2 illustrates an exemplary document file incorporating formatting tags and having hard breaks in accordance with the present invention.

Referring now to FIG. 2, a document 200 in accordance with the present invention is schematically illustrated. As shown, the document 200 comprises content 201 that includes the data necessary to reproduce the text and images of the document and, in a preferred embodiment, formatting tags used to control the manner in which the content itself is formatted for display. In the example shown, the formatting tags comprise Hypertext Markup Language (HTML) codes or tags, as known in the art, with applied Cascading Style Sheet (CSS) properties, also as known in the art. Although HTML permits the omission of many end-tags, the example explicitly includes all end-tags, as required by Extensible Markup Language (XML) syntax, also known in the art. Although HTML codes with XML syntax are illustrated, the present invention need not be limited in this regard inasmuch as any suitable formatting language, such as Standard Generalized Markup Language (SGML), or any other specialized markup language, may also be used. Furthermore, the heavy arrows at various locations throughout the content 201 illustrate the existence of exemplary hard breaks 202 within the content 201. A hard break in the context of the present invention is any boundary within the document content that corresponds to a page break that is immutable with regard to changes in document formatting. Typically, such hard breaks will be created at the time the document is authored. For example, in a novel comprising multiple chapters, hard breaks will typically be indicated at the beginning of each chapter. That is, despite any changes in formatting of the text of the novel, there will always be a break in the text at the boundaries of each chapter. In contrast, a soft break may be described as any boundary within the document content that is dependent upon formatting of the content and therefore affected by changes to formatting, e.g., changes to font size, page size, etc.

As known in the art, HTML tags can carry default formatting rules. Furthermore, formatting in CSS overrides any HTML-based formatting and can be specified using a stylesheet or using in-line styles for particular tag instances. The CSS properties controlling hard page breaks called page-break-before and page-break-after are particularly applicable to the present invention. FIG. 2 illustrates several examples of hard breaks determined by HTML tags and by in-line styles applied to particular tag instances. For example, the hard break having reference numeral 202a precedes the <BODY> tag, which is assumed in this example to carry a default formatting rule that a hard break precedes any <BODY> tag. Additionally, the tag following the hard break having reference numeral 202b reads <H1 STYLE="page-break-before: always"> and indicates that the page break should occur before the <H1> start-tag. Similarly, the hard break having reference numeral 202c follows the </P> tag, which is the end-tag whose corresponding start-tag reads <P STYLE="page-break-after: always">. This start-tag indicates that the page break should occur after the corresponding </P> end-tag.

As described in further detail below, the present invention uses the existence of hard breaks relative to any given selected portion of a document to provide efficient pagination. In particular, the hard break immediately prior to any given selected portion is used for this purpose. Table 1 below illustrates the immediate prior hard breaks, identified by corresponding reference numerals, relative to each of the exemplary selected portions, also identified by corresponding reference numerals.

TABLE 1

| Selected Portion | Prior Hard Break |
|---|---|
| 204 | 202a |
| 205 | 202a |
| 206 | 202b |
| 207 | 202b |
| 208 | 202b |
| 209 | 202b |
| 210 | 202b |
| 211 | 202c |
| 212 | 202c |
| 213 | 202c |
| 214 | 202c |

In the context of the present invention, a selected portion of a document is that portion of a document chosen by a user for immediate viewing and will typically constitute that amount of content (text, images, etc.) capable of display within a single display screen. Where the document is divided into block each comprising content capable of being displayed over more than one display screen, designation of a given block as the selected portion will result in a predetermined section of the blocks being displayed, e.g., the first reproducible page of the block. Of course, other sections could be used for this purposes as a matter of design choice, e.g., the last reproducible page of the block. The significance of a selected portion of a document will be described in further detail below.

As known in the art, the formatting tags illustrated in FIG. 2 are used to control the structure and format of the underlying content. As used throughout, the term tags is meant to include any corresponding attributes, if any. In accordance with the principles of well-formed XML, the formatting tags included in the document 200 comprise, where possible, paired start and end tags. That is, for each of the start tags shown (i.e., <HTML>, <HEAD>, <BODY>, <DIV>, <H1>, <P> and <B>), there is a corresponding end tag shown (i.e., </HTML>, </HEAD>, </BODY>, </DIV>, </H1>, </P> and </B>). As known in the art, any content encompassed by a given pair of start and end tages is processed in accordance with the meaning of those tags. For example, any text between a pair of <B> and </B> tags will be formatted as bold text. Furthermore, tags can be nested within other tag pairs, with the result that multiple formatting instructions will apply to text encompassed by the nested tags. For example, in FIG. 2, a <B> and </B> tag pair are nested within several other tag pairs. Regardless, at any point within the document 200, any hard break within the content will be subject to any number of active formatting tags. In the context of the present invention, an active formatting tag relative to a given hard break is any tag having an effect on the formatting of at least some of the content after the hard break. Table 2 below illustrates active formatting tags relative to each of the exemplary hard breaks identified by corresponding reference numerals in FIG. 2.

TABLE 2

| Hard Break | Active Formatting Tags |
|---|---|
| 202a | HTML |
| 202b | HTML, BODY, DIV |
| 202c | HTML, BODY, DIV |

As shown in Table 2, each hard break is subject to any number of active formatting tags. Note that even distally related hard breaks can be subject to the same active formatting tags (e.g., those hard breaks identified by reference numerals 202b and 202c).

Figure 3:
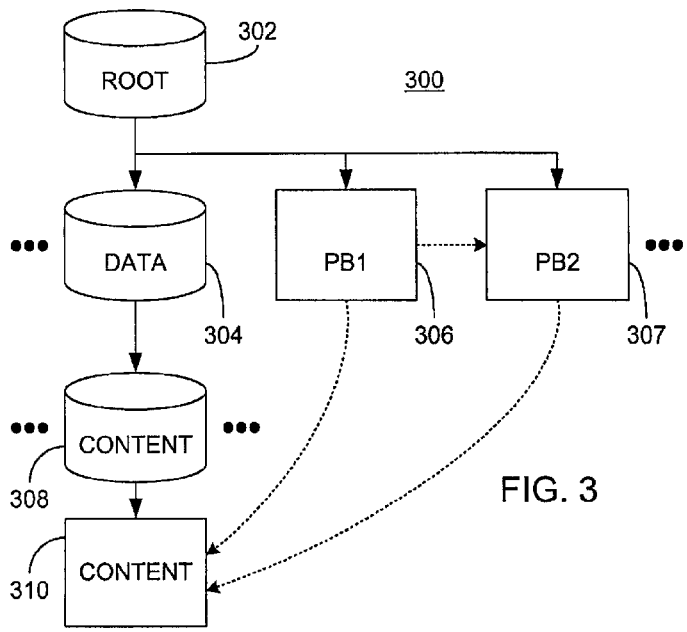
FIG. 3 illustrates a data structure that may be used to paginate a document in accordance with the present invention.

FIG. 3 illustrates a data structure 300 that supports pagination in accordance with the present invention. In particular, the data structure 300 is representative of a document and includes a root storage 302, a data storage 304, a hard break index (pb1) 306, an active formatting tag index (pb2) 307, a content storage 308 and a content stream 3 10 arranged as shown. Although a particular structure of storages and streams is illustrated in FIG. 3, other structures encompassing the same functionality may be equally employed. The data structure 300 may be stored in a computer-readable format in a suitable computer-readable medium, such as a computer hard drive, magnetic disk, etc. The data structure 300 preferably forms a part of a larger document data structure. In the parlance of shared objects programming and, in particular, the so-called Object Linking and Embedding (OLE) framework, a storage object is similar to a directory and may contain other storage and stream objects. In the same vein, a stream object is similar to a sequential file and comprises unformatted or unstructured data. Thus, the content 201 illustrated in FIG. 2 comprises one or more streams that would be stored within the content storage 308, e.g., content stream 310. In a preferred embodiment, the content 201 comprises a numerically-encoded equivalent of document content that includes formatting tags as described above. As part of the preferred embodiment, the hard break and active formatting tag indices 306, 307 are streams stored within the root storage 302. As illustrated in FIG. 3, storages at any given level of the hierarchy may comprise additional storages and/or streams not shown in FIG. 3. The dotted arrows shown in FIG. 3 indicate the existence of references between the elements shown. Thus, the hard break index 306 includes references to the active formatting tag index 307, and both indices 306, 307 include references to one or more content streams 310 encompassed by the content storage 308. A preferred embodiment of the indices 306, 307 is illustrated in greater detail in FIG. 4.

Figure 4:
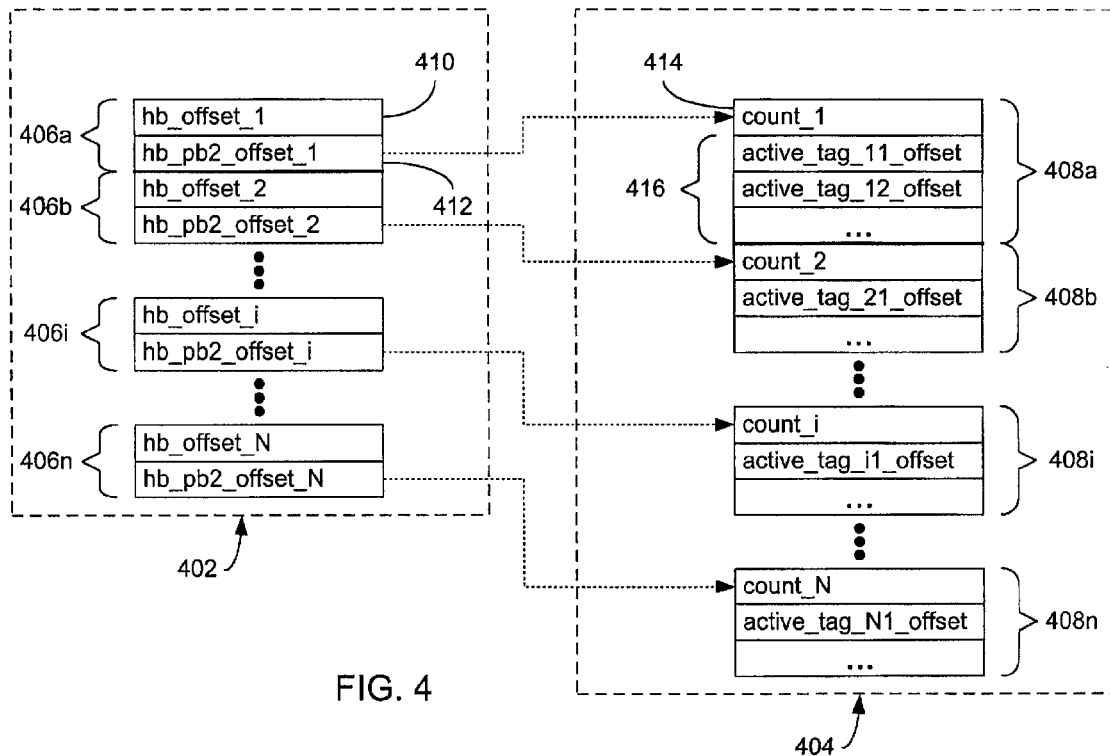
FIG. 4 illustrates in greater detail the data structure of FIG. 3.

An example of a hard break index 402 and an active formatting tag index 404 is illustrated in FIG. 4. Any given document will have its own uniquely corresponding hard break and active formatting tag indices 402, 404. The hard break index 402 comprises a plurality of fixed-length records 406 uniquely corresponding to each hard break within the document. The active formatting tag index 404 comprises a plurality of variable-length records 408 also uniquely corresponding to each hard break within the document. Each record 406 within the hard break index 402 comprises a hard break offset value 410 that indicates, relative to the beginning of a document's content, the location of a particular hard break. Referring to the example of FIG. 2, such an offset 215 is illustrated indicating the location of the hard break labeled with reference numeral 202b. As noted above, the content of a document may be stored in multiple content streams. Thus, the document may be viewed as a concatenation of multiple content streams. Where multiple content streams are used, hard break offset values each corresponding to the start of a content stream are included in the hard break index 402 in the preferred embodiment. Because each hard break offset value is relative to the beginning of a document, as opposed to the beginning of a single content stream, the hard break offset values may point to different content streams, i.e., they are calculated as if all of the content streams were concatenated into one larger stream. As an alternative to a unified index covering multiple content streams, and as a matter of design choice, it is also possible to having multiple indices having a one-to-one correspondence with multiple content streams.

Additionally, each hard break index record 406 comprises an offset 412, relative to the beginning of the active formatting tag index 404, to a corresponding portion of the active formatting tag index 404, as illustrated by the dashed arrows. Each record 408 within the active formatting tag index 404 comprises a count value 414 indicative of the length of the remainder of that record. Additionally, each active formatting tag index record 408 comprises at least one offset value 416 that indicates, relative to the beginning of a given content stream, the location of one or more active formatting tags applicable to the hard break. Referring again to the example of FIG. 2, such an offset 216 is illustrated indicating the location of the active <DIV> tag applicable to the hard break labeled with reference numeral 202b. Because the number of active formatting tags applicable to hard breaks varies according to each hard break's position within the content of the document, each record 408 likewise varies in length. The hard break and active formatting tag indices 402, 404 described herein may be used to efficiently paginate a document, as described in greater detail with reference to FIG. 5.

Although particular structures and relationships have been described above for the hard break and active formatting tag indices 402, 404, the present invention is not limited in this regard. For example, the count values 414 could be replaced by a process of taking the differences between the sequential offset entries 412 found in the hard break index 402. In another alternative, the information encompassed by the active formatting tag index 404 may be incorporated directly into the document content such that active formatting tags may be determined "on the fly" based on the information incorporated into the document content. For example, up pointers may be associated with start and/or end tags that point to enclosing tags. In this manner, a chain of pointers may be followed to ascertain the active formatting tags. In yet another alternative, such up pointers may be stored in a separate structure apart from the content stream. Although particular alternatives to the structure shown in FIG. 4 have been described herein, those having ordinary skill in the art will recognize that other implementations within the scope of the present invention may be readily devised.

Figure 5:
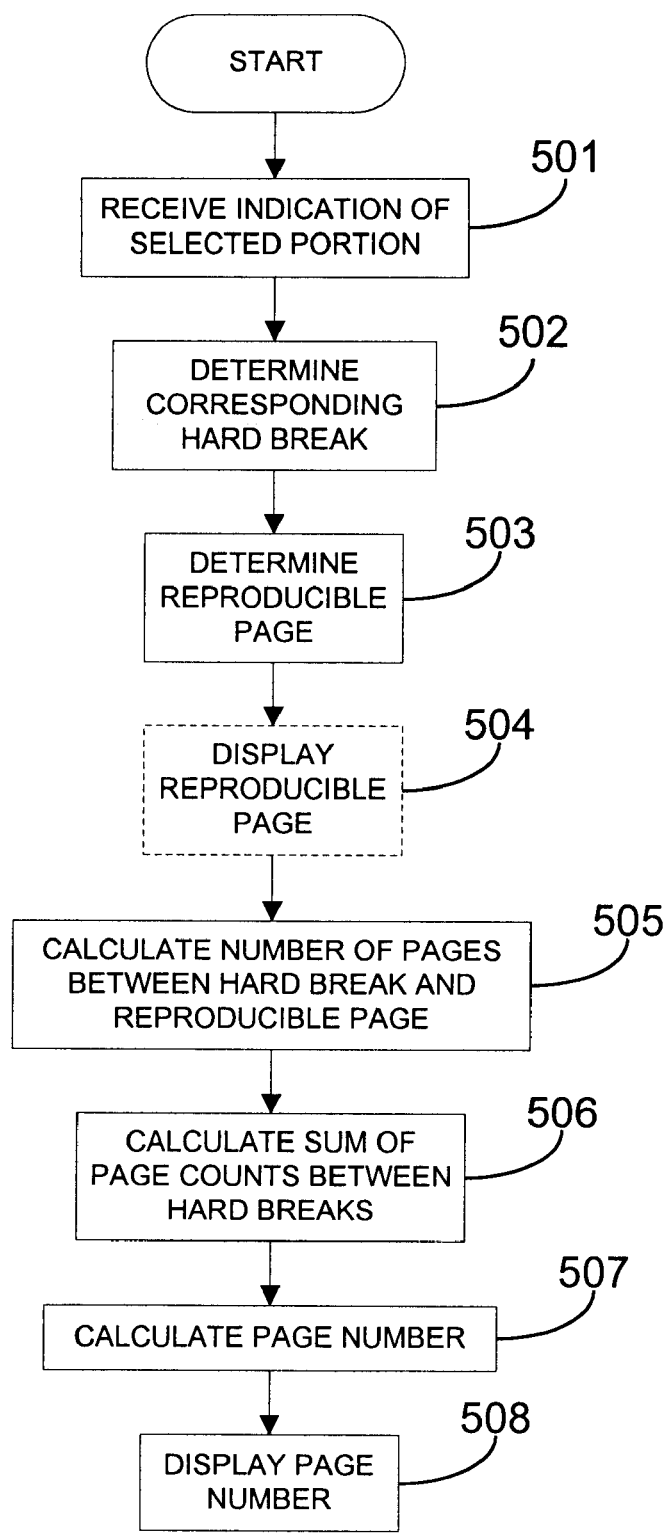
FIG. 5 is a flowchart illustrating a method for paginating a document in accordance with the present invention.

FIG. 5 is a flowchart illustrating a method for paginating a document in accordance with the present invention. In a preferred embodiment, the method illustrated in FIG. 5 is implemented using stored computer-readable instructions executed by a suitable processing platform, although any combination of such software instructions and hardware-based implementation may be used. At step 501, an indication of a selected portion of a document (e.g., any of the selected portions 204–214) is received. This may be achieved in any manner, such as where a user opens a document to a previously-marked portion of the document, or where the user quickly flips or scrolls through the document before finally selecting a portion to view. At a minimum, the indication of the selected portion points to or otherwise identifies a location within the document to be viewed by the user.

At step 502, the immediately prior hard break relative to the selected portion is determined. For example, referring to FIG. 2, if an indication of the selected portion labeled 206 is received, the immediately prior hard break labeled 202b would be identified at this step. Where the indication of the selected portion is represented as an offset relative to the beginning of the document's content, this step may be carried out using the hard break index 402. That is, the indication may be compared with the set of hard break offset values 410 to find the greatest hard break offset value that is less than the offset value in the indication is determined. The hard break corresponding to the record 406 comprising this hard break offset value is therefore deemed to be the immediately prior hard break relative to the selected portion.

At step 503, a reproducible page encompassing the selected portion is determined. As its name would imply, a reproducible page is a portion of formatted content that is unchanging relative to the hard break identified at step 502 and therefore may be consistently reproduced for display. To determine such a reproducible page, all content starting from the identified hard break up to and at least including the selected portion is formatted in accordance with any active formatting tags beginning at the identified hard break and any additional tags intervening between the hard break and the selected portion. In a preferred embodiment, the active formatting tags for the hard break are identified by accessing the hard break's corresponding record 406, following the offset 412 within that record 406 to a corresponding record 408 in the open formatting tag index 404 and, for each active formatting tag offset 416 included in the record 408, accessing the content to identify the relevant tag. For example, assume that an indication of the selected portion labeled 214 is received and the hard break labeled 202c is subsequently identified. Beginning at the hard break 202c, initial content after the hard break 202c and before the selected portion 214 will be formatted in accordance with the active <HTML>, <BODY> and <DIV> tags. However, some of the content between the hard break 202c and the selected portion 214 will not be subject to the <DIV> tag's active formatting, because that content-portion follows the </DIV> end-tag. Additionally, at least some content between the hard break 202c and the selected portion 214 will also need to be formatted in accordance with the intervening <I>, </I> tag pair. So long as the occurrence of formatting tags within the content is static (i.e., tags cannot be added or removed or their attributes modified between accesses to the document), the above-described procedure will ensure that the content encompassing the selected portion will always be reproducibly formatted, thereby leading to a reproducible page. Because this formatting process is done from a known hard break, rather than the beginning of the content, it takes considerably less time to perform, particularly where the selected portion occurs relatively close to the end of the content.

In a preferred embodiment, the formatting process of step 503 is performed such that at least a portion of the content subsequent to the selected portion is also formatted and determined to be acceptably formatted before the final determination of a reproducible page is made. For example, if a complete page corresponding to the selected portion has been formatted, at least one more line of text on a page immediately after the formatted selected portion is also formatted and checked to make sure it is acceptably formatted. For example, it is generally considered inappropriate to format a page of text such that a widow (the last line of a paragraph printed by itself at the top of a page) or orphan (the first line of a paragraph printed by itself at the bottom of a page) occurs on the subsequent page. Of course, the relative acceptability of a subsequently formatted page need not be based solely on the occurrence of widows and the like; other criteria readily apparent to those having ordinary skill in the art may be equally applied.

At step 504, the reproducible page may be optionally displayed, typically via a display device such as a computer screen. If displayed at this point, the reproducible page will not include a page number since no such number has yet been determined. In a preferred embodiment, the reproducible page is displayed prior to or, at the least, concurrent with the processing required to determine a page number for the reproducible page. As an alternative, the page number can be calculated prior to the step of displaying the reproducible page, at which point the reproducible page will be displayed along with the page number.

Regardless, at step 505, a number of pages inclusively between the hard break identified at step 502 and the reproducible page determined at step 503 is determined. In a preferred embodiment, this is done by incrementing the number of pages as successive pages are formatted during the processing of step 503. In this manner, the number of pages between the hard break and the reproducible page is determined at the same time the reproducible page is determined.

Continuing at step 506, a sum of page counts between hard breaks prior to and including the identified hard break is calculated. To this end, it is assumed that the entire document has been paginated at least once at some point in time prior to the execution of the process illustrated in FIG. 5. When such prior pagination occurs, it is therefore possible to determine the number of pages normally existing between hard breaks (assuming that the formatting of the content, i.e., font size, font face, page size, etc., has not changed). Referring to FIG. 2, and assuming that the content illustrated therein has been fully paginated at least once before, there should be a static number of pages (page count) between the first hard break 202a and the second hard break 202b. This is illustrated in FIG. 2 by the $\Delta_l$ symbol. A similar static page count between the second and third hard breaks and static page counts between any subsequent pairs of hard breaks may also be determined and stored in memory. In a preferred embodiment, the page counts described above are stored separately from the information regarding hard breaks and active formatting tags, i.e., the hard break index 402 and active formatting tag index 404. Furthermore, it is anticipated that that multiple sets of page-counts may be associated with a publication to accommodate, for example, different format settings that may be selected by a user. That is, separate page counts for each setting are stored so that if a user has read the book in accordance with one setting, switches to another setting, and then later switches back, the appropriate page count information will continue to be available.

Assuming that the page counts are reliable, the page counts between the beginning of the content and the identified hard break may be summed together to arrive at a page total up to the identified hard break. By adding, at step 507, this sum of page counts to the number of pages inclusively between the hard break and the reproducible page, a page number for the reproducible page may be readily calculated. Because this method does not require each page from the beginning of the content to the reproducible page to be first formatted and numbered, the present invention allows page numbers to be efficiently determined, particularly in those cases where the reproducible page occurs relatively close to the end of the document's content. Finally, at step 508, the page number thus determined may be displayed. Again, this may be subsequent to, or concurrent with, the step of displaying the reproducible page as described above.

In the foregoing specification, the present invention has been described with reference to specific exemplary embodiments thereof. Although the invention has been described in terms of a preferred embodiment, those skilled in the art will recognize that various modifications, embodiments or variations of the invention can be practiced within the spirit and scope of the invention as set forth in the appended claims. All are considered within the sphere, spirit, and scope of the invention. The specification and drawings are, therefore, to be regarded in an illustrated rather than restrictive sense. Accordingly, it is not intended that the invention be limited except as may be necessary in view of the appended claims.

What is claimed is:

1. A computer-readable medium having stored thereon computer-executable instructions for performing steps of:

receiving an indication of a selected portion of a document that is suitable for display via a computer-based device;

determining a hard break in the document immediately prior to the selected portion;

determining a reproducible page corresponding to the selected portion based upon the hard break;

calculating a number of pages inclusively between the reproducible page and the hard break;

calculating a sum of page counts between a plurality of hard breaks prior to and including the hard break; and calculating a page number by adding the number of pages to the sum of page counts.

2. The computer-readable medium of claim 1, further comprising computer-executable instructions for performing steps of:

displaying the reproducible page on a display of the computer-based device; and displaying the page number within the reproducible page on the display.

3. The computer-readable medium of claim 2, further comprising computer-executable instructions for performing the step of displaying the reproducible page no later than calculating the page number.

4. A computer-readable medium having stored thereon a data structure comprising:

hard break information relating occurrences of at least one hard break to locations within a document, wherein the document is suitable for display via a computer-based device; and active formatting tag information regarding occurrences of one or more active formatting tags applicable to each of the at least one hard break listed in the hard break information, wherein, for any selected portion of the document, a reproducible page is determined based on the hard break information and the active formatting tag information, and wherein the hard break information relating occurrences of the at least one hard break to locations within the document comprises, for each hard break of the at least one hard break, an offset value, relative to the beginning of the document, indicative of location of the hard break.

5. A computer-readable medium having stored thereon a data structure comprising:

hard break information relating occurrences of at least one hard break to locations within a document, wherein the document is suitable for display via a computer-based device; and active formatting tag information regarding occurrences of one or more active formatting tags applicable to each of the at least one hard break listed in the hard break information, wherein, for any selected portion of the document, a reproducible page is determined based on the hard break information and the active formatting tag information, and wherein the active formatting tag information regarding occurrences of the at least one or more active formatting tags applicable to each of the at least one hard break further comprises, for each hard break of the at least one hard break, one or more offset value, relative to the beginning of the content stream forming a part of the document, indicative of locations of the one or more active formatting tags.

6. A computer-readable medium having stored thereon a data structure comprising:

hard break information relating occurrences of at least one hard break to locations within a document, wherein the document is suitable for display via a computer-based device; and active formatting tag information regarding occurrences of one or more active formatting tags applicable to each of the at least one hard break listed in the hard break information, wherein, for any selected portion of the document, a reproducible page is determined based on the hard break information and the active formatting tag information, and wherein the hard break index further comprises, for each hard break of the at least one hard break, an offset value, relative to the beginning of the active formatting tag index, indicative of location of a corresponding portion of the active formatting tag index.

* * * * *

UNITED STATES PATENT AND TRADEMARK OFFICE
CERTIFICATE OF CORRECTION

PATENT NO. : 6,789,229 B1
DATED : September 7, 2004
INVENTOR(S) : Jerry Dunietz

It is certified that error appears in the above-identified patent and that said Letters Patent is hereby corrected as shown below:

Column 5,
Line 9, delete "<Hi" and insert -- <H1 --, therefore.
Line 11, delete "<Hi>" and insert -- <H1> --, therefore.

Signed and Sealed this

Third Day of May, 2005

JON W. DUDAS
*Director of the United States Patent and Trademark Office*